(12) United States Patent
Lee

(10) Patent No.: US 12,332,814 B2
(45) Date of Patent: Jun. 17, 2025

(54) METHOD AND SYSTEM FOR OBTAINING OPTIMAL NUMBER OF DMA CHANNELS

(71) Applicant: SAMSUNG ELECTRONICS CO., LTD., Suwon-si (KR)

(72) Inventor: Hanju Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 31 days.

(21) Appl. No.: 18/216,215

(22) Filed: Jun. 29, 2023

(65) Prior Publication Data
US 2024/0184723 A1 Jun. 6, 2024

(30) Foreign Application Priority Data
Dec. 2, 2022 (KR) .......... 10-2022-0167037

(51) Int. Cl.
*G06F 13/16* (2006.01)
*G06F 13/30* (2006.01)

(52) U.S. Cl.
CPC .......... *G06F 13/1673* (2013.01); *G06F 13/30* (2013.01)

(58) Field of Classification Search
CPC .............................. G06F 13/1673; G06F 13/30
See application file for complete search history.

(56) References Cited

U.S. PATENT DOCUMENTS

| | | | |
|---|---|---|---|
| 5,983,301 A * | 11/1999 | Baker | G06F 13/28 710/22 |
| 7,752,349 B2 | 7/2010 | Ishida et al. | |
| 8,095,700 B2 | 1/2012 | Alexandron et al. | |
| 9,785,584 B2 | 10/2017 | Park | |
| 10,459,854 B2 | 10/2019 | Park | |
| 10,977,531 B1 * | 4/2021 | Nakamura | G06K 15/1898 |
| 2004/0024946 A1 * | 2/2004 | Naumann | G06F 15/78 710/309 |
| 2007/0169059 A1 * | 7/2007 | Halambi | G06F 8/4452 717/160 |
| 2016/0203091 A1 | 7/2016 | Lee | |
| 2019/0332324 A1 | 10/2019 | Kim | |

FOREIGN PATENT DOCUMENTS

CN 106951388 A 7/2017

\* cited by examiner

*Primary Examiner* — Zachary K Huson
(74) *Attorney, Agent, or Firm* — Sughrue Mion, PLLC (57) ABSTRACT

The present disclosure provides methods and apparatuses for processing data. In some embodiments, the method includes operating a device by transmitting, to a host, first data using a plurality of direct memory access (DMA) channels regardless of an order of each DMA channel of the plurality of DMA channels. The method further includes obtaining an optimal number of the DMA channels based on a process capacity of a receiver buffer of the host. The method further includes transmitting, by the device to the host, second data based on the optimal number of the DMA channels.

20 Claims, 7 Drawing Sheets

METHOD AND SYSTEM FOR OBTAINING OPTIMAL NUMBER OF DMA CHANNELS

CROSS-REFERENCE TO RELATED APPLICATIONS

This application claims benefit of priority under 35 U.S.C. § 119 to Korean Patent Application No. 10-2022-0167037, filed on Dec. 2, 2022, in the Korean Intellectual Property Office, the disclosure of which is incorporated by reference herein in its entirety.

BACKGROUND

1. Field

The present disclosure relates generally to an electronic device, and more particularly, to a method and a system for obtaining an optimal number of direct memory access (DMA) channels that produce the highest performance.

2. Description of Related Art

A central processing unit (CPU) may be involved in a process in which data is transmitted (e.g., between two electronic devices). However, when a large amount of data is transmitted, a large load may be applied to the CPU. Consequently, when a large load is applied to the CPU, the overall performance of a system (e.g., an electronic device) including the CPU may be degraded. In order to potentially reduce the load on the CPU, some related systems may use DMA technology, which may refer to a method of directly transmitting data without going through the CPU.

Alternatively or additionally, related systems may attempt to increase data transmission speed of the systems by transmitting data through DMA channels as soon as the data is prepared regardless of the order of the DMA channels. However, when a memory capacity of a receiver buffer of a receiving device of the related system is not sufficient to receive the transmitted data, the data transmission performance of the related system may be degraded in receiving data.

There exists a need for further improvements in DMA technology, as the need for increased data transmission speeds may be constrained by receive buffer capacity. Improvements are presented herein. These improvements may also be applicable to other memory access technologies and the standards that employ these technologies.

SUMMARY

The present disclosure provides a method and a system for obtaining an optimal number of direct memory access (DMA) channels.

The problems to be solved by the present disclosure are not limited to the above-described problems, and some other problems may be understood by one of ordinary skill in the art from the following descriptions hereinafter.

According to an aspect of the present disclosure, a method of processing data is provided. The method includes operating a device by transmitting, to a host, first data using a plurality of DMA channels regardless of an order of each DMA channel of the plurality of DMA channels. The method further includes obtaining an optimal number of the DMA channels based on a process capacity of a receiver buffer of the host. The method further includes transmitting, by the device to the host, second data based on the optimal number of the DMA channels.

According to an aspect of the present disclosure, a method of processing data is provided. The method includes processing, by the device, the data in a non-sequential manner by using N DMA channels. N is a positive integer greater than zero. The method further includes determining an optimal number of the DMA channels that maximizes a data read speed with a host. The optimal number of the DMA channels is greater than zero and less than or equal to N. The method further includes operating the device based on the optimal number of the DMA channels.

According to an aspect of the present disclosure, a system of processing data is provided. The system includes a device configured to process data in a non-sequential manner based on an optimal number of DMA channels, and a host including a receiver buffer and configured to transmit a command to the device. The device is further configured to obtain the optimal number of the DMA channels by negotiation with the host.

Additional aspects are set forth in part in the description which follows and, in part, may be apparent from the description, and/or may be learned by practice of the presented embodiments.

BRIEF DESCRIPTION OF DRAWINGS

The above and other aspects, features, and advantages of certain embodiments of the present disclosure are to be more apparent from the following description taken in conjunction with the accompanying drawings, in which.

DETAILED DESCRIPTION

The following description with reference to the accompanying drawings is provided to assist in a comprehensive understanding of embodiments of the present disclosure defined by the claims and their equivalents. Various specific details are included to assist in understanding, but these details are considered to be exemplary only. Therefore, those of ordinary skill in the art may recognize that various changes and modifications of the embodiments described herein can be made without departing from the scope and spirit of the disclosure. In addition, descriptions of well-known functions and structures are omitted for clarity and conciseness.

With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

It is to be understood that when an element or layer is referred to as being "over," "above," "on," "below," "under," "beneath," "connected to" or "coupled to" another element or layer, it can be directly over, above, on, below, under, beneath, connected or coupled to the other element or layer or intervening elements or layers may be present. In contrast, when an element is referred to as being "directly over," "directly above," "directly on," "directly below," "directly under," "directly beneath," "directly connected to" or "directly coupled to" another element or layer, there are no intervening elements or layers present.

The terms "upper," "middle", "lower", etc. may be replaced with terms, such as "first", "second," third" to be used to describe relative positions of elements. The terms "first," "second," third" may be used to described various elements but the elements are not limited by the terms and a "first element" may be referred to as a "second element". Alternatively or additionally, the terms "first", "second", "third", etc. may be used to distinguish components from each other and do not limit the present disclosure. For example, the terms "first", "second", "third", etc. may not necessarily involve an order or a numerical meaning of any form.

Reference throughout the present disclosure to "one embodiment," "an embodiment," "an example embodiment," or similar language may indicate that a particular feature, structure, or characteristic described in connection with the indicated embodiment is included in at least one embodiment of the present solution. Thus, the phrases "in one embodiment", "in an embodiment," "in an example embodiment," and similar language throughout this disclosure may, but do not necessarily, all refer to the same embodiment.

It is to be understood that the specific order or hierarchy of blocks in the processes/flowcharts disclosed are an illustration of exemplary approaches. Based upon design preferences, it is understood that the specific order or hierarchy of blocks in the processes/flowcharts may be rearranged. Further, some blocks may be combined or omitted. The accompanying claims present elements of the various blocks in a sample order, and are not meant to be limited to the specific order or hierarchy presented.

Hereinafter, embodiments of the present disclosure are described in with reference to the accompanying drawings.

Figure 1:
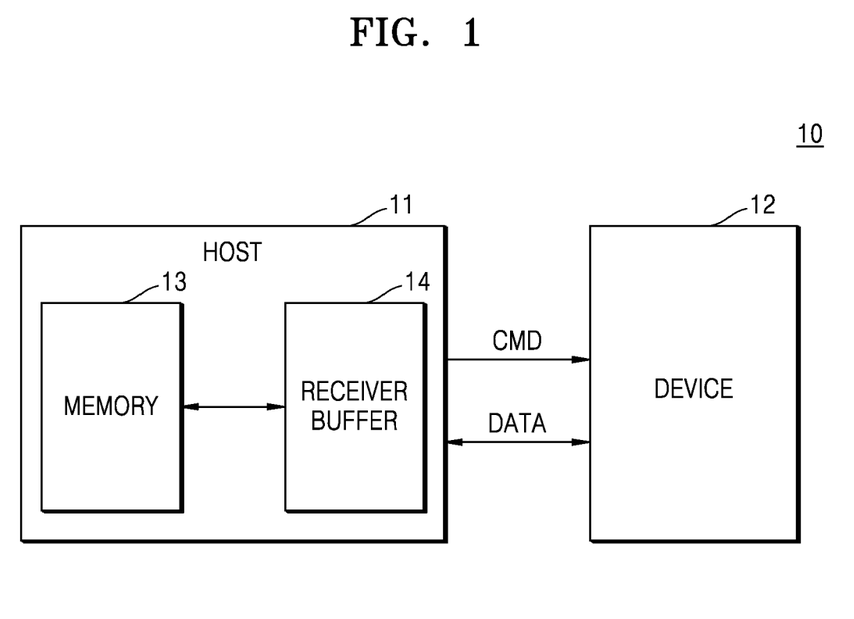
FIG. 1 is a block diagram showing a system, according to an embodiment.

FIG. 1 is a block diagram showing a system 10, according to an embodiment.

Referring to FIG. 1, the system 10, according to an embodiment, may include a host 11 and a device 12.

The host 11 may transmit a command CMD to the device 12. For example, the host 11 may transmit a read command to the device 12 and may read data DATA from the device 12 in response to the read command, to thereby store the data DATA in the host. Alternatively or additionally, the host 11 may transmit a write command to the device 12 and may store data DATA in the host into the device 12 in response to the write command. As another example, the host 11 may transmit a dummy command to the device 12. The dummy command may instruct to test the performance of the system 10. In an embodiment, the host 11 may transmit a dummy read command to the device 12 to test the performance of the system 10, and/or the device 12 may transmit dummy data to the host in response to the dummy read command. The dummy read command is further described with reference to FIG. 6.

The host 11 may include a memory 13 and a receiver buffer 14.

The memory 13 may be and/or may include a volatile memory and/or a nonvolatile memory. For example, the memory 13 may include a dynamic random access memory (DRAM), but is not limited thereto. The memory 13 may store instructions and/or data DATA related to at least one other element in the system 10. For example, the memory 13 may store data DATA received from the device 12.

The receiver buffer 14 may include a buffer for receiving data DATA from the device 12 to the memory 13 of the host 11. Alternatively or additionally, the receive buffer 14 may temporarily store the data DATA.

The device 12 may receive a command CMD from the host 11. Alternatively or additionally, the device 12 may transmit and/or receive the data DATA to and/or from the host 11.

In an embodiment, the device 12 may transmit the data DATA to the host 11 by using a direct memory access (DMA) method. That is, the device 12 may transmit the data DATA to the host 11 without any interventions of a central processing unit (CPU) in the host 11. Alternatively or additionally, the device 12 may transmit the data DATA through at least one DMA channel. A plurality of DMA channels may be embodied in hardware, such as, but not limited to, DMA engines in the device 12. Alternatively or additionally, the plurality of DMA channels may be embodied in software, such as, but not limited to, logically distinguished channels. In an optional or additional embodiment, the device 12 may increase the data transmission speed of the system 10 by using the DMA method.

In an embodiment, the device 12 may transmit data DATA to the host 11 out of order regardless of the order of DMA channels. For example, when transmitting data DATA to the host 11, in response to a plurality of commands, the device 12 may firstly transmit data DATA of a prepared channel which may be ready for transmitting regardless of the order of the DMA channels. Since the device 12 may directly transmit the prepared data DATA regardless of the order of the DMA channel, the data transmission speed of the system 10 may be increased.

Figure 2:
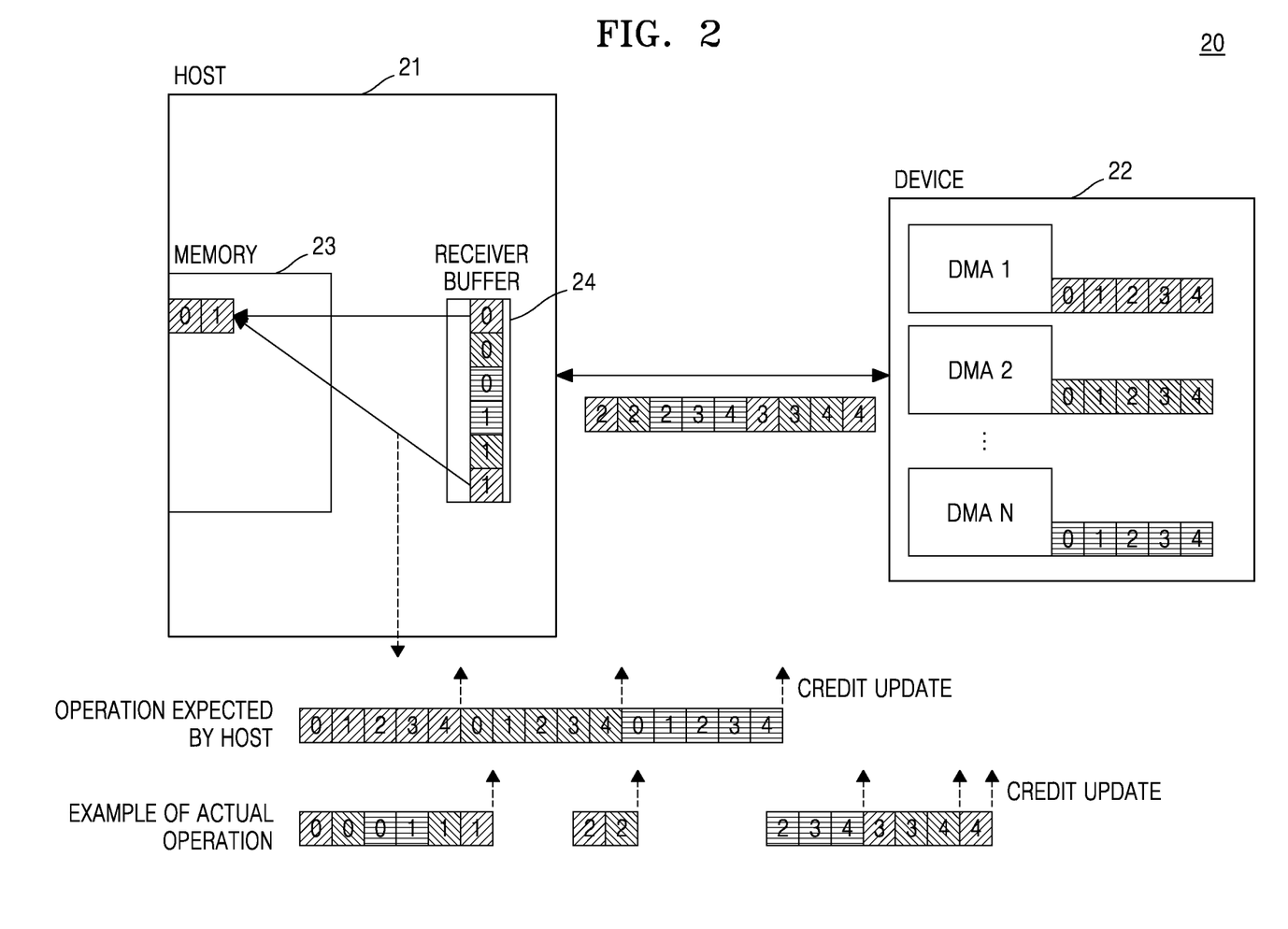
FIG. 2 is a view illustrating a system, according to a comparative example.

FIG. 2 is a view illustrating a system, according to a comparative example.

Referring to FIG. 2, the system 20 may include a host 21 and a device 22.

The host 21 may include a memory 23 and a receiver buffer 24. The memory 23 may store instructions and/or data related to at least one other element in the system 20. For example, the memory 23 may store data received from the device 22.

The receiver buffer 24 may include a buffer for receiving data DATA from the device 22 to the memory 23 of the host 21. Alternatively or additionally, the receive buffer 24 may temporarily store the data DATA.

The device 22 may transmit and/or receive data to and/or from the host 21. For example, the device 22 may transmit data to the host 21 by using a DMA method. That is, the device 22 may transmit data to the host 21 without intervention by a CPU of the device 22.

As shown in FIG. 2, the device 22 may transmit data through N DMA channels, where N is a positive integer greater than zero (0). For example, the device 22 may transmit data through a first DMA channel DMA 1, a second DMA channel DMA 2, to an Nth DMA channel DMA N. Alternatively or additionally, the device 22 may transmit data to the host 21 out of order regardless of the order of DMA channels. For example, when transmitting data to the host 21 in response to a plurality of commands, the device 22 may firstly transmit data of a prepared channel which may be ready for transmitting regardless of the order of the DMA channels.

In an embodiment, the performance of the system 20, such as, but not limited to, a data read speed and an accuracy of data read, may vary depending on the capacity of the receiver buffer 24. For example, when a buffer capacity of the receiver buffer 24 is large enough to handle all data received from the N DMA channels, the data read speed may be the fastest when the device 22 transmits data through all the N DMA channels.

However, when the buffer capacity of the receiver buffer 24 is not sufficiently large for processing all data received from the N DMA channels, a bottleneck may occur in the receiver buffer 24. As shown in FIG. 2, when the buffer capacity of the receiver buffer 24 is not sufficient to store the received data (e.g., data 0 to data 4 ("01234", "01234", . . . , "01234") of first DMA channel DMA 1, the second DMA channel DMA 2, to the Nth DMA channel DMA N, a bottleneck may occur if the data (e.g., data 0 to data 4) is not received by the receiver buffer 24 in an expected order (e.g., "01234", "01234", . . . , "01234"), but instead a portion the data (e.g., "000111") is transmitted to the receiver buffer 24. Accordingly, the host 21 may perform a data processing based on an operation (000111 22 2343344) different from an expected operation (012340123401234) due to the bottleneck in the receiver buffer 24. That is, when the receiver buffer 24 becomes full, a partial memory write operation may be performed by a unit other than a preset memory transfer unit. Accordingly, the accuracy of the data processing may be reduced and/or the data processing speed may be decreased in the system 20.

For example, assuming that the transmit unit of data by which the device 22 may transmit data through each DMA channel is four (4) kilobytes (KB) and the receiver buffer 24 has a capacity of the data of eight (8) KB for the data processing, the bottleneck may occur if the device 22 transmits data to the host 21 through three (3) or more DMA channels. That is, even though the device 22 may use three (3) or more DMA channels, the data processing speed of the device 22 may be slower than when using two (2) DMA channels.

For example, the data may be processed by using an increased number of DMA channels for the purpose of increasing the data processing speed of the system 20. However, the host 21 may not perform as expected by the increased number of DMA channels due to the insufficient capacity of the receiver buffer 24. Alternatively or additionally, the data processing speed of the system may be slower than when the data is processed by using only a smaller number of DMA channels. As another example, when the device 22 is allowed to process data regardless of the order of DMA channels for the purpose of increasing the data processing speed of the system 20, the host 21 may not operate as expected by the unordered DMA channels due to the insufficient capacity of the receiver buffer 24. Consequently, the data processing speed of the system may be slower than when the data is processed sequentially in order of the DMA channels.

Therefore, there is a need for determining an optimal number of DMA channels that may be provided in consideration of the capacity of the receiver buffer 24 that may result in an increase of the performance of the system. A method, according to an embodiment, may obtain the optimal number of DMA channels by considering the capacity of the receiver buffer by the negotiation between the host and the device, which may allow the device to process data based on the corresponding optimal number of DMA channels. The negotiation between the host and the device is described hereinafter with reference to corresponding drawings.

Figure 3:
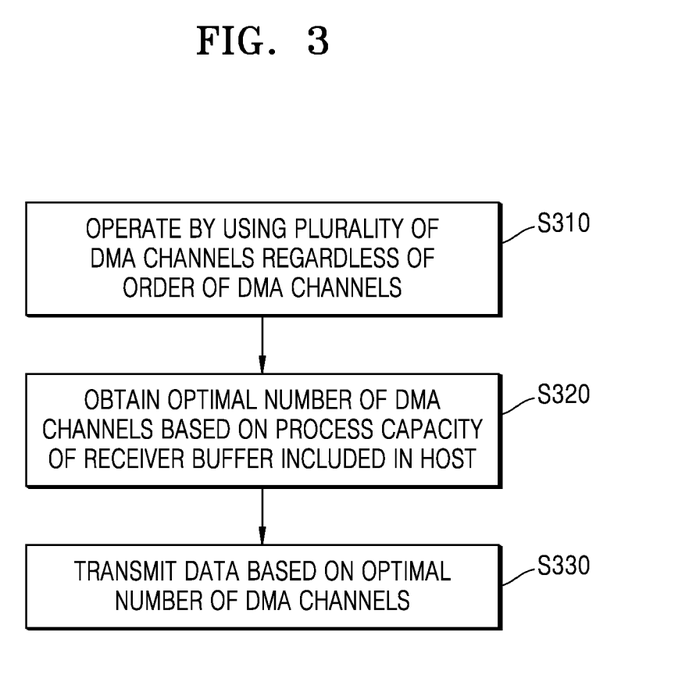
FIG. 3 is a flowchart showing a method, according to an embodiment.

FIG. 3 is a flowchart showing a method, according to an embodiment.

Referring to FIG. 3, a method according to an embodiment may include operations S310, S320, and S330.

In operation S310, the device may operate by using a plurality of DMA channels (e.g., N) without consideration to the order of the DMA channels. That is, the device may transmit data to a host in a non-sequential manner regardless of the order of the DMA channels. For example, when transmitting data in response to a plurality of commands received from the host, the device may firstly transmit data of a prepared DMA channel that is ready for transmitting regardless of the order of the DMA channels. Since the device may immediately transmit the prepared data regardless of the order of the DMA channels, the data transmission speed of the system may increase, when compared to transmission speeds in which the data is sent in sequential DMA channel order (e.g., data is transmitted with regard to the order to the DMA channels).

In operation S320, the device and/or the host may obtain an optimal number of DMA channels based on a process capacity of the receiver buffer in the host. The optimal number of DMA channels may indicate the number of DMA channels that may maximize the data processing speed of the system, and/or that may potentially prevent bottlenecks from occurring in the receiver buffer.

The host may determine the optimal number of DMA channels based on the size of data transmitted by the DMA channels, credit information, and/or the process capacity of the receiver buffer. That is, the host may obtain a process capacity of data that the receiver buffer may process, a transmit size unit of data transmitted by the device, and/or the credit information. For example, when the process capacity of the data that the receiver buffer may process is 8 KB and the transmit size unit for each DMA channel of the device is 4 KB, the host may determine the optimal number of DMA channels by the credit information, and the like. Alternatively or additionally, in the example in which the process capacity of the data that the receiver buffer may process is 8 KB and the transmit size unit for each DMA channel of the device is 4 KB, no bottleneck may occur, and the data may be processed at the fastest data process speed, when two (2) DMA channels are provided. Accordingly, the optimal number of DMA channels may be calculated as two (2), and the host may determine that the optimal number of DMA channels is two (2). In an embodiment, the host may inform the optimal number of DMA channels to the device by transmitting information about the determined optimal number of DMA channels.

In operation S330, the device may transmit data based on the optimal number of DMA channels. For example, when the process capacity of the data that the receiver buffer may process is 8 KB and the transmit size unit for each DMA channel of the device is 4 KB, two (2) DMA channels may be used for transmitting data to the host even though the device may include more than two (2) DMA channels. By making the device operate with the optimal number of DMA channels, the system may prevent the occurrence of the bottleneck in the receiver buffer and may obtain a faster data processing speed.

Figure 4:
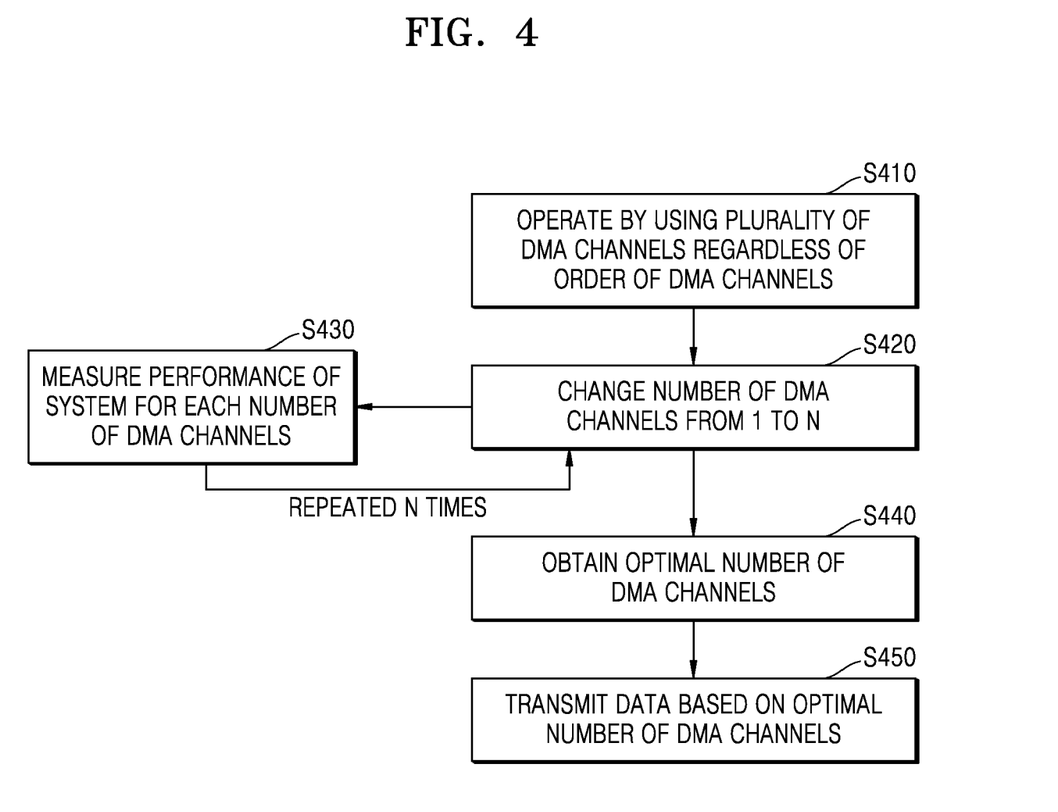
FIG. 4 is a flowchart showing a method, according to an embodiment.

FIG. 4 is a flowchart showing a method, according to an embodiment.

Referring to FIG. 4, a method according to an embodiment may include operations S410, S420, S430, S440, and S450.

In operation S410, the device may operate by using a plurality of DMA channels (e.g., N) regardless of the order of the DMA channels. That is, the device may transmit data to a host in a non-sequential manner regardless of the order of the DMA channels. For example, when transmitting data in response to a plurality of commands received from the host, the device may firstly transmit data of a prepared DMA channel that may be ready for transmitting regardless of the order of the DMA channels. Since the device may immediately transmit the prepared data regardless of the order of the DMA channels, the data transmission speed of the system may increase, when compared to transmission speeds in which the data is sent in sequential DMA channel order (e.g., data is transmitted with regard to the order to the DMA channels).

In operation S420, the device may change the number of DMA channels from one (1) to N. For example, the device may transmit data to the host with changing the number of DMA channels from one (1) to N for measuring the performance of the system.

In operation S430, the device and/or the host may measure the performance of the system for each changed number of the DMA channels.

For example, the device may change the number of the DMA channels and operate based on a first changed number of DMA channels. Then, the device and/or the host may measure a first system performance level regarding the first changed number of DMA channels. Alternatively or additionally, the device may change again the number of the DMA channels and operate based on a second changed number of DMA channels. Then, the device and/or the host may measure a second system performance level regarding the second changed number of DMA channels. Thereafter, the device and/or the host may obtain the optimal number of DMA channels by comparing a previous system performance level to the current system performance level.

In an embodiment, the device may change the number of DMA channels to one (1) and then transmit data to the host. Consequently, the device and/or the host may measure the performance of the system when only one (1) DMA channel is used.

Subsequently, the device may change the number of DMA channels to two (2) and transmit data to the host. Alternatively or additionally, the device and/or the host may measure the performance of the system when only two (2) DMA channels are used.

That is, the device may change the number of DMA channels up to N one by one and transmit data to the host whenever the number of DMA channels is changed. Alternatively or additionally, the device and/or the host may measure the performance of the system when each changed number of DMA channels, from one (1) to N, are used. In other words, in a method according to an embodiment, operation S420 and operation S430 may be each repeated N times.

By comparing the N performances of the system with one another, the device and/or the host may define (e.g., determine) the number of DMA channels at which the data processing speed of the system (e.g., data read speed) may be the fastest as the optimal number of DMA channels.

For example, assuming that N is 4, the transmit size unit for transmitting data to the memory is 4 KB, and the process capacity by which the receiver buffer processes data is 8 KB, the device may transmit data to the host using one (1) to four (4) DMA channels (e.g., by changing the number of DMA channels from one (1) to four (4)). In such an embodiment, since the transmit size unit is 4 KB and the process capacity of the receiver buffer is 8 KB, a bottleneck may occur in the receiver buffer when the number of DMA channels is three (3) and/or four (4). Accordingly, the performance of the system may be degraded. Therefore, when the number of DMA channels is three (3) and/or four (4), the performance of the system, such as, but not limited to, a data read speed, may be degraded (e.g., reduced) when compared to the performance of the system when the number of DMA channels is one (1) and/or two (2). Comparing the performance of the system in cases in which a bottleneck may not occur (e.g., in a case with one (1) DMA channel and/or a case with two DMA channels), the performance of the system may be better when the number of DMA channels is two (2). Accordingly, the optimal number of DMA channels may be determined as two (2). It is to be understood that these are examples of the present disclosure for convenience of description, and the present disclosure is not limited thereto. For example, in some embodiments, the optimal number of DMA may be determined to be any other number in the range of one (1) to N.

In operation S440, the device and/or the host may obtain the optimal number of DMA channels.

In operation S450, the device may transmit data to the host based on the optimal number of DMA channels. That is, by making the device operate with the optimal number of DMA channels, the system may prevent the occurrence of a bottleneck in the receiver buffer and may achieve a fast data processing speed.

Figure 5:
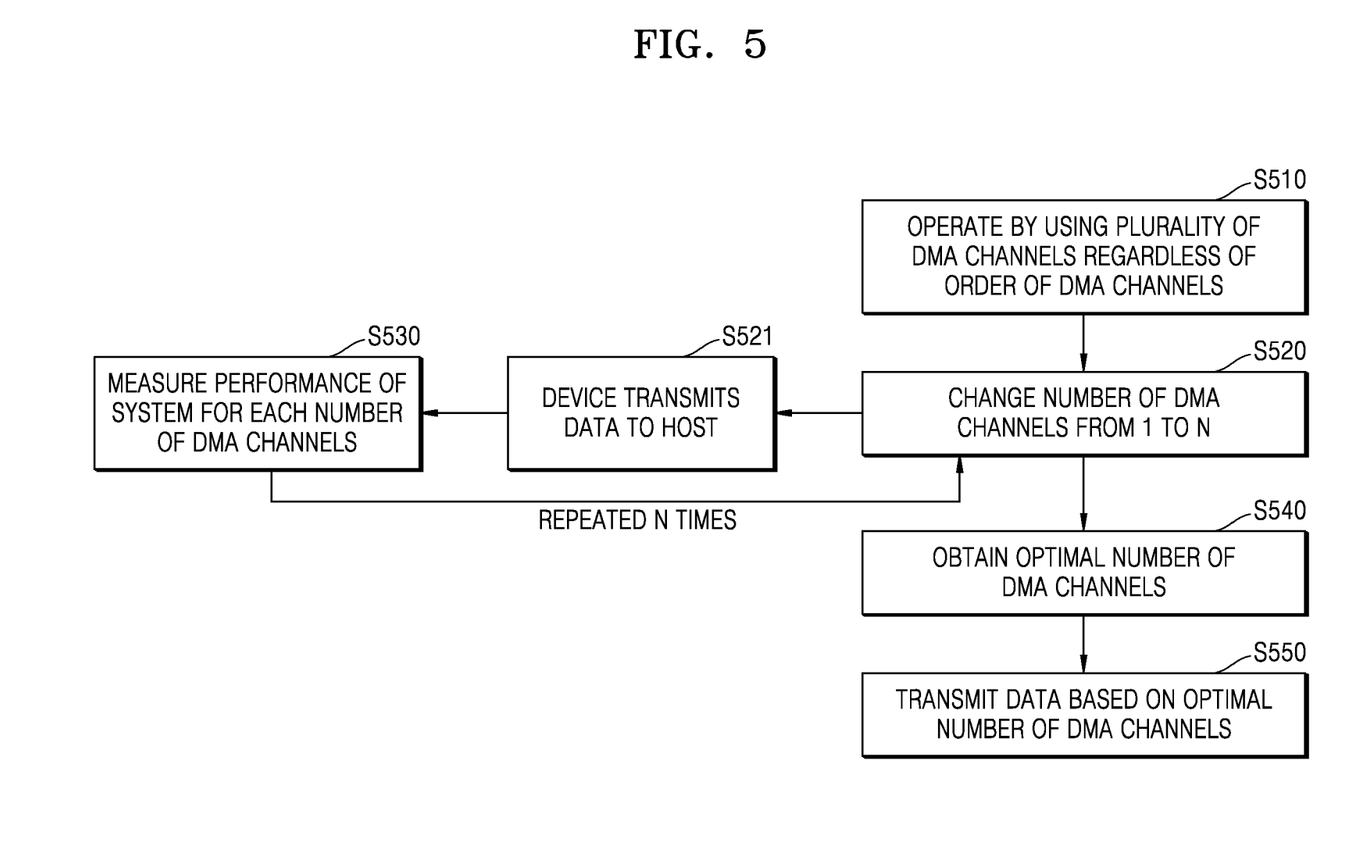
FIG. 5 is a flowchart showing a method, according to an embodiment.

FIG. 5 is a flowchart showing a method, according to an embodiment.

Referring to FIG. 5, a method according to an embodiment may include operations S510, S520, S521, S530, S540, and S550.

In operation S510, the device may operate by using a plurality of DMA channels (e.g., N) regardless of the order of the DMA channels. That is, the device may transmit data to a host in a non-sequential manner regardless of the order of the DMA channels. For example, when transmitting data in response to a plurality of commands received from the host, the device may firstly transmit data of a prepared DMA channel that may be ready for transmitting regardless of the order of the DMA channels. Since the device may immediately transmit the prepared data regardless of the order of the DMA channels, the data transmission speed of the system may increase, when compared to transmission speeds in which the data is sent in sequential DMA channel order (e.g., data is transmitted with regard to the order to the DMA channels).

In operation S520, the device may change the number of DMA channels from one (1) to N. For example, the device may transmit data to the host with changing the number of DMA channels from one (1) to N for measuring the performance of the system.

In operation S521, when transmitting data to the host, the device may transmit dummy data. The dummy data may include data which may be transmitted to the host for measuring the performance of the system. For example, the device may prevent problems, such as data loss and/or system malfunction, by transmitting the dummy data to the host for measuring the performance of the system. In an embodiment, the device may transmit the dummy data to the host without receiving any additional commands from the host for performing a self-test for the performance of the system. Alternatively or additionally, the device may transmit dummy data to the host based on a dummy read command that may be received from the host. The dummy read command is described with reference to FIG. 6.

In operation S530, the device and/or the host may measure the performance of the system for each changed number of the DMA channels.

For example, the device may change the number of the DMA channels and operate based on a first changed number of DMA channels. Then, the device and/or the host may measure a first system performance level regarding the first changed number of DMA channels. Alternatively or additionally, the device may change again the number of the DMA channels and operate based on a second changed number of DMA channels. Then, the device and/or the host may measure a second system performance level regarding the second changed number of DMA channels. Thereafter, the device and/or the host may obtain the optimal number of DMA channels by comparing a previous system performance level and the current system performance level.

In an embodiment, the device may change the number of DMA channels to one (1) and then transmit data to the host. Consequently, the device and/or the host may measure the performance of the system when only one (1) DMA channel is used.

Subsequently, the device may change the number of DMA channels to two (2) and transmit data to the host. Alternatively or additionally, the device and/or the host may measure the performance of the system when using only two (2) DMA channels.

That is, the device may change the number of DMA channels up to N one by one and transmit data to the host whenever the number of DMA channels is changed. Alternatively or additionally, the device and/or the host may measure the performance of the system when N DMA channels are used. In other words, in a method according to an embodiment, operations S520, S521, and S530 may be repeated N times.

By comparing N measured system performances with one another, the device and/or the host may define (e.g., determine) the number of DMA channels at which the data processing speed of the system (e.g., data read speed) may be the fastest as the optimal number of DMA channels.

For example, assuming that N is 4, the transmit size unit for transmitting data to the memory is 4 KB, and the process capacity by which the receiver buffer processes data is 8 KB, the device may transmit data to the host using one (1) to four (4) DMA channels (e.g., by changing the number of DMA channels from one (1) to four (4)). In such an embodiment, since the transmit size unit is 4 KB and the process capacity of the receiver buffer is 8 KB, a bottleneck may occur in the receiver buffer when the number of DMA channels is three (3) and/or four (4). Accordingly, the performance of the system may be degraded. Therefore, when the number of DMA channels is three (3) and/or four (4), the performance of the system, such as, but not limited to, a data read speed, may be degraded (e.g., reduced) when compared to the performance of the system when the number of DMA channels is one (1) and/or two (2). Comparing the performance of the system in cases in which a bottleneck may not occur (e.g., in a case with one (1) DMA channel and/or a case with two (2) DMA channels), the performance of the system may be better when the number of DMA channels is two (2). Accordingly, the optimal number of DMA channels may be determined as two (2). It is to be understood that these are examples of the present disclosure for convenience of description, and the present disclosure is not limited thereto. For example, in some embodiments, the optimal number of DMA may be determined to be any other number in the range of one (1) to N.

Accordingly, in operation S540, the device and/or the host may obtain the optimal number of DMA channels.

In operation S550, the device may transmit data to the host based on the optimal number of DMA channels. That is, by making the device operate with the optimal number of DMA channels, the system may prevent occurrence of a bottleneck in the receiver buffer and may achieve a fast data processing speed.

Figure 6:
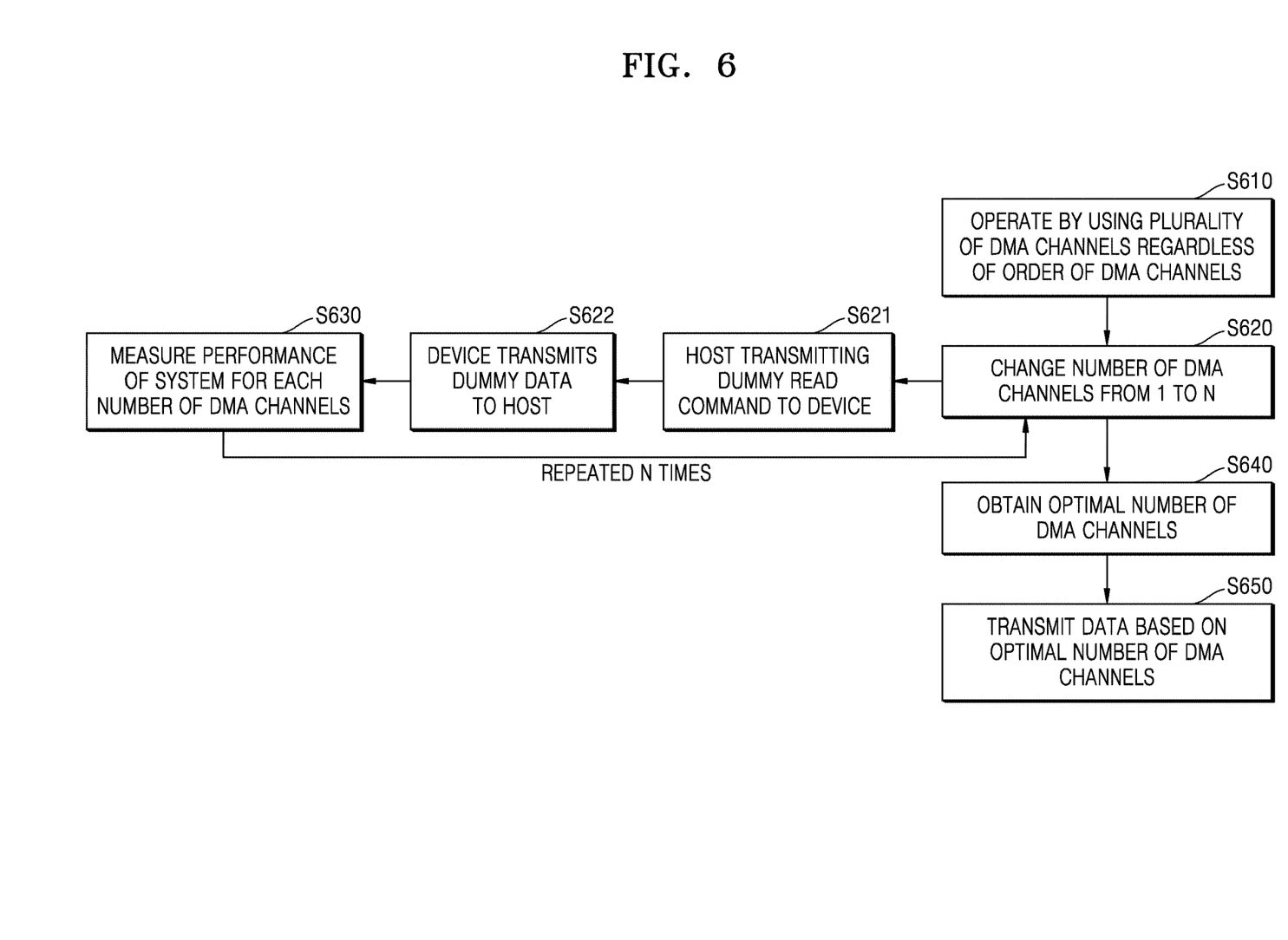
FIG. 6 is a flowchart showing a method, according to an embodiment.

FIG. 6 is a flowchart showing a method, according to an embodiment.

Referring to FIG. 6, a method according to an embodiment may include operations S610, S620, S621, S622, S630, S640, and S650.

In operation S610, the device may operate by using a plurality of DMA channels (e.g., N) regardless of the order of the DMA channels. That is, the device may transmit data to a host in a non-sequential manner regardless of the order of the DMA channels. For example, when a device transmits data in response to a plurality of commands received from a host, the data on a DMA channel that may be ready to be transmitted regardless of the order may be first transmitted. Since the device may immediately transmit the prepared data regardless of the order of the DMA channels, the data transmission speed of the system may increase, when compared to transmission speeds in which the data is sent in sequential DMA channel order (e.g., data is transmitted with regard to the order to the DMA channels).

In operation S620, the device may change the number of DMA channels from one (1) to N. For example, the device may transmit data to the host with changing the number of DMA channels from one (1) to N for measuring the performance of the system.

In operation S621, the host may transmit a dummy read command to the device. For example, the host may receive data from the device for measuring the performance of the system for each number of the DMA channels. In such an embodiment, the data received by the host may be dummy data for preventing data loss and/or malfunction of the system. Accordingly, the host may transmit a dummy read command to the device. The dummy read command may include a command for receiving dummy data from the device.

In operation S622, the device may transmit the dummy data to the host. That is, the device may transmit the dummy data to the host as the dummy read command is received from the host. The device may prevent problems, such as, but not limited to, data loss and/or system malfunction, by transmitting the dummy data to the host for measuring the performance of the system.

In operation S630, the device and/or the host may measure the performance of the system for each changed number of the DMA channels.

For example, the device may change the number of the DMA channels and operate based on a first changed number of DMA channels. Then, the device and/or the host may measure a first system performance level regarding the first changed number of DMA channels. Alternatively or additionally, the device may change again the number of the DMA channels and operate based on a second changed number of DMA channels. Then, the device and/or the host may measure a second system performance level regarding the second changed number of DMA channels. Thereafter, the device and/or the host may obtain the optimal number of DMA channels by comparing a previous system performance level and the current system performance level.

In an embodiment, the device may change the number of DMA channels to one (1) and then transmit data to the host. Consequently, the device and/or the host may measure the performance of the system when only one (1) DMA channel is used.

Subsequently, the device may change the number of DMA channels to two (2) and transmit data to the host. Alternatively or additionally, the device and/or the host may measure the performance of the system when only two (2) DMA channels are used.

That is, the device may change the number of DMA channels up to N one by one and transmit data to the host whenever the number of DMA channels is changed. Alternatively or additionally, the device and/or the host may measure the performance of the system when N DMA channels are used. In other words, in a method according to an embodiment, operations S620, S621, S622, and S630 may be repeated N times.

By comparing N measured system performances with one another, the device and/or the host may define (e.g., determine) the number of the DMA channels at which the data processing speed of the system (e.g., data read speed) may be the fastest as the optimal number of DMA channels.

For example, assuming that N is 4, the transmit size unit for transmitting data to the memory is 4 KB, and the process capacity by which the receiver buffer processes data is 8 KB. In such an example, the host may transmit the dummy read command to the device, and the device may transmit dummy data to the host with a plurality of DMA channels (e.g., from one (1) to four (4)). When the transmit size unit is 4 KB and the process capacity of the receiver buffer is 8 KB, a bottleneck may occur in the receiver buffer when the number of DMA channels is three (3) or four (4). Accordingly, the performance of the system may be degraded (e.g., reduced) when compared to the performance of the system when the number of DMA channels is one (1) and/or two (2). That is, when the number of DMA channels is three (3) and/or four (4), the performance of the system, such as, but not be limited to, a data read speed, may be degraded when compared to the performance of the system when the number of DMA channels is one (1) or two (2). Comparing the performance of the system in cases in which a bottleneck may not occur (e.g., in a case with one (1) DMA channel and/or a case with two (2) DMA channels), the performance of the system may be better when the number of DMA channels is two (2). Accordingly, the optimal number of DMA channel may be determined as two (2). It is to be understood that these are examples of the present disclosure for convenience of description, and the present disclosure is not limited thereto. For example, in some embodiments, the optimal number of DMA may be determined to be any other number in the range of one (1) to N.

Accordingly, in operation S640, the device and/or the host may obtain the optimal number of DMA channels.

In operation S650, the device may transmit data to the host based on the optimal number of DMA channels. That is, by making the device operate with the optimal number of DMA channels, the system may prevent the occurrence of a bottleneck in the receiver buffer and may achieve a fast data processing speed.

Figure 7:
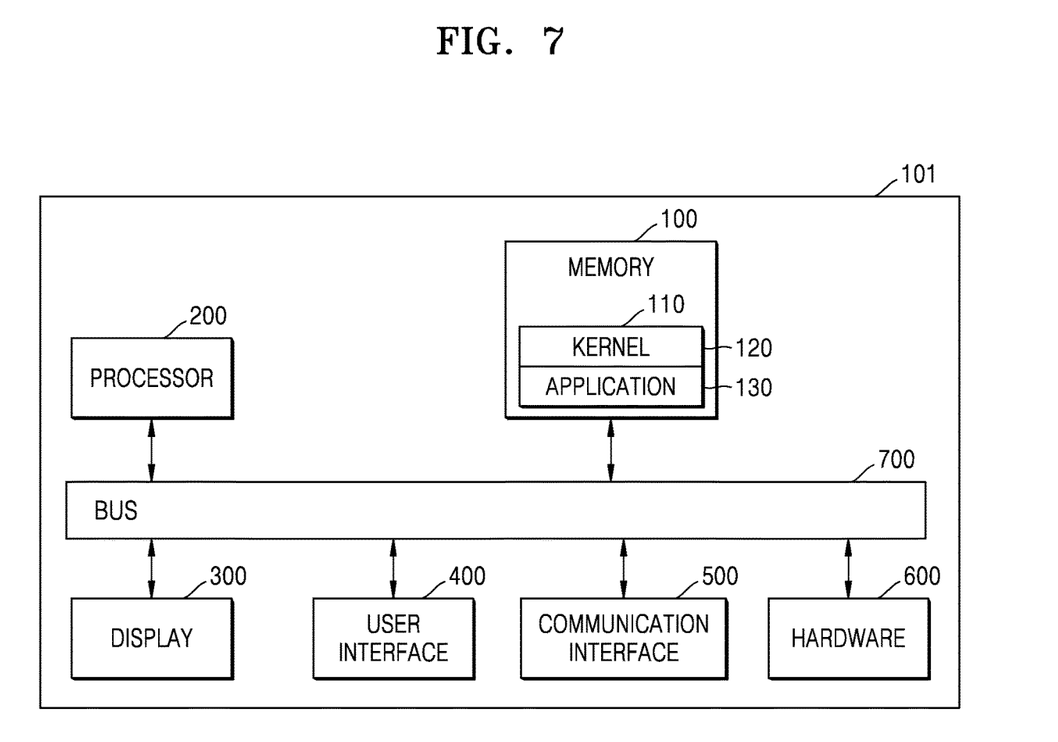
FIG. 7 is a block diagram showing a system, according to an embodiment.

FIG. 7 is a block diagram showing a system, according to an embodiment.

Referring to FIG. 7 is a diagram showing a system 101, according to an embodiment.

The system 101 may include a memory 100, a processor 200, a display 300, a user interface 400, a communication interface 500, a hardware 600, and a bus 700. In an embodiment, the system 101 may not include at least one of the memory 100, the processor 200, the display 300, the user interface 400, the communication interface 500, the hardware 600, and the bus 700, or may further include other components. That is, the number and arrangement of components of the system 101 shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Alternatively or additionally, a set of (one or more) components shown in FIG. 7 may be integrated with each other and implemented as an integrated circuit, as software, and/or a combination of circuits and software.

The memory 100 may be and/or may include a volatile memory and/or a nonvolatile memory. The memory 100 may store, for example, instructions and/or data related to at least one other component in the system 101. In an embodiment, the memory 100 may store software and/or a program 110. The program 110 may be and/or may include, for example, a kernel 120 and/or an application 130. In an embodiment, at least a part of the kernel 120 may be referred to as an operating system (OS).

The kernel 120 may control and/or manage system resources (e.g., buses, processors, or memory) used to execute operations and/or functions implemented in other programs (e.g., application 130). Alternatively or additionally, the kernel 120 may provide, to the application 130, an interface for controlling and/or managing system resources by accessing individual components in the system 101.

In an embodiment, the processor 200 may control the hardware 600 by executing the program 110 in the memory 100.

The processor 200 may be and/or may include one or more of a central processing unit (CPU), an application processor (AP), and a communication processor (CP). The processor 200 may perform, for example, operations and/or data processing regarding the control of and/or the communication with at least one component in the system 101 (e.g., memory 100, processor 200, display 300, user interface 400, communication interface 500, hardware 600, bus 700). The processor 200 may execute the program 110 in the memory 100. Alternatively or additionally, the processor 200 may control the devices in the system 101 and/or perform the data processing.

The display 300 may be and/or may include, for example, a liquid crystal display (LCD), a light-emitting diode (LED)

display, organic light-emitting diode (OLED) display, microelectromechanical systems (MEMS) display, and electronic paper display. The display 300 may display various contents (e.g., a text, an image, a video, an icon, a symbol, and the like) to a user. Alternatively or additionally, the display 300 may include a touch screen, and may receive, for example, a touch, gesture, proximity, or hovering input using an electronic pen or a portion of the user's body.

In an embodiment, the user interface 400 may function as an interface for transferring commands and/or data entered from a user and/or other external device to other components in the system 101. Alternatively or additionally, the user interface 400 may output commands and/or data received from other components in the system 101 to the user and/or to other external devices.

In an embodiment, the communication interface 500 may establish communication between the system 101 and an external device. For example, the communication interface 500 may be connected to a network by wireless communication or wired communication, to thereby communicate with an external device.

For example, the wireless communication may use, but not be limited to, at least one of a long-term evolution (LTE), an LTE advance (LTE-A), a code division multiple access (CDMA), a wideband CDMA (WCDMA), an universal mobile telecommunications system (UMTS), a wireless broadband (WiBro), and/or global system for mobile communications (GSM). Alternatively or additionally, the wireless communication may include a short-range communication. The short-range communication may include, but not be limited to, at least one of wireless fidelity (WiFi), Bluetooth™, near field communication (NFC), and/or a global navigation satellite system (GNSS).

For example, the network may include at least one of a telecommunications network, a computer network (e.g., local area network (LAN) or wide-area network (WAN)), the internet, and/or a telephone network.

In an embodiment, the hardware 600 may include one or more modules for performing a specific function. For example, the hardware 600 may include a sensor module. In an optional or additional embodiment, the hardware 600 may include a module for performing an image processing function. In an optional or additional embodiment, the hardware 600 may include a power management module. Although FIG. 7 illustrates that only one hardware 600 is provided in the system 101, the number of hardware 600 is not limited thereto. For example, a plurality of hardware 600 may be provided in the system 101 based on demands of required functions and/or design constraints. In the present disclosure, the hardware 600 may be referred to as a hardware device and/or a device.

In an embodiment, the bus 700 may include one or more electric circuits that may connect (e.g., electrically couple) the components (e.g., memory 100, processor 200, display 300, user interface 400, communication interface 500, hardware 600) to each other and may transmit communication signals (e.g., control messages and/or data) between the components (e.g., memory 100, processor 200, display 300, user interface 400, communication interface 500, and hardware 600).

In an embodiment, the system 101 may process data by using a plurality of DMA channels. Alternatively or additionally, the system 101 may obtain the optimal number of DMA channels and may process data based on the optimal number of DMA channels.

In an embodiment, the hardware 600 may process the data in the memory 100 under the control of the at least one processor 200.

Exemplary embodiments have been disclosed in drawings and specifications as described above. Embodiments have been described using specific terms in the present disclosure, but the embodiments may be used only for the purpose of describing the technical idea of the present disclosure and may not be used to limit the scope of the present disclosure described in meaning or claims. Therefore, those skilled in the art are to understand that various modifications and equal other embodiments are possible therefrom. Therefore, the true scope of technical protection of the present disclosure should be determined by the technical idea of the appended claims.

While the present disclosure has been particularly shown and described with reference to embodiments thereof, it is to be understood that various changes in form and details may be made therein without departing from the spirit and scope of the following claims.

What is claimed is:

1. A method, comprising:
   operating a device by transmitting, from the device to a host, first data using a first changed number of direct memory access (DMA) channels from among a plurality of DMA channels regardless of an order of each DMA channel;
   transmitting, from the device to the host, second data using a second number of DMA channels from among the plurality of DMA channels regardless of the order of each DMA channel;
   comparing a first system performance of the transmitting of the first data and a second system performance of the transmitting of the second data;
   obtaining an optimal number of the DMA channels based on the comparing of the first system performance and the second system performance; and
   transmitting, from the device to the host, third data based on the optimal number of the DMA channels.

2. The method of claim 1, wherein the obtaining of the optimal number of the DMA channels comprises:
   obtaining, by the device, the optimal number of the DMA channels based on a comparison of a first size of the first data transmitted and a second size of the second data.

3. The method of claim 2, wherein the obtaining of the optimal number of the DMA channels further comprises:
   receiving, by the device from the host, a process capacity of a receiver buffer of the host; and
   obtaining of the optimal number of the DMA channels based on the process capacity of the receiver buffer of the host.

4. The method of claim 1, further comprising:
   changing, by the device, a number of the plurality of DMA channels, to form the first changed number of the DMA channels;
   operating the device based on the first changed number of the DMA channels; and
   measuring the first system performance based on the first changed number of the DMA channels.

5. The method of claim 4, further comprising:
   changing, by the device, the number of the plurality of DMA channels, to form the second changed number of the DMA channels, the second changed number being different from the first changed number;
   operating the device based on the second changed number of the DMA channels; and measuring the second system performance regarding the second changed number of the DMA channels.

6. The method of claim 1, wherein the first system performance comprises at least one of a read speed of read data and an accuracy of the read data.

7. The method of claim 4, further comprising:
transmitting, by the device to the host, dummy data based on the first changed number of the DMA channels.

8. The method of claim 4, further comprising:
receiving, by the device from the host, a dummy read command.

9. A method of processing data by a device, the method comprising:
processing, by the device, first data in a non-sequential manner by using N direct memory access (DMA) channels, wherein N is a positive integer greater than zero;
processing, by the device, second data in a non-sequential manner by using M direct memory access (DMA) channels, wherein M is a positive integer greater than zero, and wherein M is different than N;
determining an optimal number of the DMA channels that maximizes a data read speed with a host by comparing a first system performance of the processing of the first data and a second system performance of the processing of the second data, wherein the optimal number of the DMA channels is greater than zero and less than or equal to N and M; and
operating the device based on the optimal number of the DMA channels.

10. The method of claim 9, wherein the determining of the optimal number of DMA channels comprises:
obtaining, by the device, the optimal number of the DMA channels based on at least one of a comparison of a first size of the first data and a second size of the second data, or a process capacity of a receiver buffer of the host.

11. The method of claim 10, further comprising:
receiving, by the device from the host, the process capacity of the receiver buffer of the host.

12. The method of claim 9, further comprising:
changing, by the device, a number of the DMA channels from one (1) to N; and
obtaining the read speed for each changed number of the DMA channels.

13. The method of claim 12, further comprising:
transmitting, by the device, dummy data based on each changed number of the DMA channels.

14. The method of claim 10, wherein the determining of the optimal number of the DMA channels comprises:
receiving, by the device from the host, a dummy read command.

15. A system, comprising:
a device configured to process data in a non-sequential manner based on an optimal number of direct memory access (DMA) channels; and
a host comprising a receiver buffer and configured to transmit a command to the device,
wherein the device is further configured to obtain the optimal number of the DMA channels by comparing system performance information obtained by performing negotiation with the host.

16. The system of claim 15, wherein the host is further configured to:
calculate the optimal number of the DMA channels based on at least one of a comparison of a first size of first data transmitted by a first number of DMA channels and a second size of second data transmitted by a second number of DMA channels, or a process capacity of the receiver buffer.

17. The system of claim 15, wherein:
the device comprises N DMA channels, wherein N is a positive integer greater than zero, and
the device is further configured to:
change a number of the DMA channels from 1 to N;
measure performances of the system for each changed number of the DMA channels; and
obtain the optimal number of the DMA channels based on the measured performances.

18. The system of claim 17, wherein the measured performances of the system comprises at least one of a read speed of read data and an accuracy of the read data.

19. The system of claim 17, wherein the device is further configured to:
transmit, to the host, dummy data based on the changed number of the DMA channels.

20. The system of claim 17, wherein the host is further configured to: transmit, to the device, a dummy read command.

* * * * *